(12) United States Patent
Nishigaki et al.

(10) Patent No.: US 9,752,676 B2
(45) Date of Patent: Sep. 5, 2017

(54) HYBRID VEHICLE

(71) Applicant: TOYOTA JIDOSHA KABUSHIKI KAISHA, Toyota-shi, Aichi-ken (JP)

(72) Inventors: Nobuhide Nishigaki, Toyota (JP); Masaya Yamamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/363,090

(22) Filed: Nov. 29, 2016

(65) Prior Publication Data

US 2017/0159801 A1   Jun. 8, 2017

(30) Foreign Application Priority Data

Dec. 3, 2015   (JP) ................................. 2015-236200

(51) Int. Cl.
*B60W 10/06* (2006.01)
*B60W 10/115* (2012.01)
(Continued)

(52) U.S. Cl.
CPC ......... *F16H 61/0202* (2013.01); *B60K 6/365* (2013.01); *B60K 6/445* (2013.01); *B60W 20/00* (2013.01); *F16H 3/724* (2013.01); *B60Y 2200/92* (2013.01); *B60Y 2300/70* (2013.01); *B60Y 2400/73* (2013.01); *Y10S 903/911* (2013.01); *Y10S 903/947* (2013.01)

(58) Field of Classification Search
None
See application file for complete search history.

(56) References Cited

U.S. PATENT DOCUMENTS

| | | | |
|---|---|---|---|
| 2007/0155581 A1* | 7/2007 | Tabata | B60K 6/40 477/3 |
| 2007/0256871 A1* | 11/2007 | Kaneko | B60K 6/442 180/65.27 |

(Continued)

FOREIGN PATENT DOCUMENTS

| | | |
|---|---|---|
| JP | 2012-162097 | 8/2012 |
| JP | 2014-65365 | 4/2014 |

(Continued)

*Primary Examiner* — Edwin A Young
(74) *Attorney, Agent, or Firm* — Finnegan, Henderson, Farabow, Garrett & Dunner, LLP

(57) ABSTRACT

A hybrid vehicle includes an internal combustion engine, a first motor, a second motor, a first planetary gear mechanism, a second planetary gear mechanism, a battery, and an electronic control unit. The first planetary gear mechanism includes a first rotating element, a second rotating element, and a third rotating element. The internal combustion engine is coupled to the second rotating element. The second planetary gear mechanism includes a fourth rotating element, a fifth rotating element, and a sixth rotating element. A brake is connected to the fifth rotating element. The electronic control unit is configured to turn on the brake at a time of high-vehicle-speed ignition-off of the hybrid vehicle such that the fifth rotating element is in a rotation stop state. The high-vehicle-speed ignition-off is that an ignition is off while the hybrid vehicle is traveling at a predetermined vehicle speed or higher while operating the internal combustion engine.

2 Claims, 9 Drawing Sheets

(51) Int. Cl.
*F16H 61/02* (2006.01)
*B60K 6/365* (2007.10)
*F16H 3/72* (2006.01)
*B60K 6/445* (2007.10)
*B60W 20/00* (2016.01)

(56) References Cited

U.S. PATENT DOCUMENTS

2010/0029429 A1* 2/2010 Ota .................. B60K 6/445
 475/5
2013/0151057 A1* 6/2013 Matsubara ............ B60K 6/445
 701/22

FOREIGN PATENT DOCUMENTS

| JP | 2015-77846 | 4/2015 |
| WO | WO 2015/056087 A1 | 4/2015 |

* cited by examiner

HYBRID VEHICLE

INCORPORATION BY REFERENCE

The disclosure of Japanese Patent Application No. 2015-236200 filed on Dec. 3, 2015 including the specification, drawings and abstract is incorporated herein by reference in its entirety.

BACKGROUND

1. Technical Field

The present disclosure relates to a hybrid vehicle, and in particular, to a hybrid vehicle including an internal combustion engine, a first motor, a second motor, and a planetary gear mechanism.

2. Description of Related Art

Hitherto, as this kind of hybrid vehicle, a hybrid vehicle which includes an internal combustion engine, a first motor, a second motor, and a planetary gear mechanism, and controls the first motor such that the rotation speed of the internal combustion engine increases when the rotation speed of the first motor increases when the operation of the internal combustion engine is stopped according to ignition-off during traveling has been suggested (for example, Japanese Patent Application Publication No. 2012-162097 (JP 2012-162097 A)). In this hybrid vehicle, the first motor is coupled to a sun gear of the planetary gear mechanism, an axle is coupled to a ring gear, and the internal combustion engine is coupled to a carrier. If the vehicle travels on a descending road in a state of ignition-off, the rotation speed of the first motor increases in a negative rotation direction with an increase in vehicle speed. At this time, torque in a positive rotation direction is output from the first motor to increase the rotation speed of the internal combustion engine from zero. With this, an increase in the negative rotation direction of the rotation speed of the first motor is suppressed.

SUMMARY

In the above-described hybrid vehicle, if the ignition is off when the vehicle travels on a road other than a descending road at a high vehicle speed, since the operation of the internal combustion engine is stopped, the rotation speed of the first motor increases rapidly in the negative rotation direction, and the first motor may over-rotates in the negative rotation direction. In this case or when the rotation speed of the first motor increases in the negative rotation direction on a descending road, like the above-described hybrid vehicle, a case where torque in the positive rotation direction is output from the first motor is considered; however, since the first motor functions as a power generator, when a battery is nearly fully charged, the battery may become overcharged.

The present disclosure provides a hybrid vehicle capable of preventing over-rotation of a first motor when the ignition is off during traveling at a high vehicle speed.

A hybrid vehicle according to an aspect of the present disclosure includes an internal combustion engine, a first motor, a second motor, a first planetary gear mechanism, a second planetary gear mechanism, a battery, and an electronic control unit. The first planetary gear mechanism includes a first rotating element, a second rotating element, and a third rotating element. The first motor is coupled to the first rotating element. The internal combustion engine is coupled to the second rotating element. A drive shaft coupled to drive wheels of the hybrid vehicle and the second motor are coupled to the third rotating element. The first planetary gear mechanism is configured such that the first rotating element, the second rotating element, and the third rotating element are arranged in order on an alignment chart. The second planetary gear mechanism includes a fourth rotating element, a fifth rotating element, and a sixth rotating element. The first rotating element is coupled to the fourth rotating element. A brake is connected to the fifth rotating element. The second rotating element is coupled to the sixth rotating element. The second planetary gear mechanism is configured such that the fourth rotating element, the fifth rotating element, and the sixth rotating element are arranged in order on an alignment chart. The battery is configured to transmit and receive electric power to and from the first motor and the second motor. The electronic control unit is configured to turn on the brake at a time of an ignition-off at a high vehicle speed of the hybrid vehicle such that the fifth rotating element is brought into a rotation stop state. The ignition-off at the high vehicle speed is when the ignition is off while the hybrid vehicle is traveling at a predetermined vehicle speed or higher while operating the internal combustion engine.

According to the hybrid vehicle of the above-described aspect, the first rotating element, the second rotating element, and the third rotating element of the first planetary gear mechanism are arranged in this order on the alignment chart, and the fourth rotating element, the fifth rotating element, and the sixth rotating element of the second planetary gear mechanism are arranged in this order on the alignment chart. The first rotating element of the first planetary gear mechanism is coupled to the fourth rotating element of the second planetary gear mechanism, and the second rotating element of the first planetary gear mechanism is coupled to the sixth rotating element of the second planetary gear mechanism. Accordingly, the first rotating element and the fourth rotating element, the fifth rotating element, the second rotating element and the sixth rotating element, and the third rotating element are arranged in this order on the alignment chart. That is, the four rotating elements of the first rotating element, the fifth rotating element, the second rotating element, and the third rotating element are arranged in this order on the alignment chart. The first motor is coupled to the first rotating element, the brake is connected to the fifth rotating element, the internal combustion engine is coupled to the second rotating element, and the drive shaft and the second motor are coupled to the third rotating element. When the hybrid vehicle travels at a high vehicle speed equal to or higher than the predetermined vehicle speed, the brake is turned off, the drive shaft (third rotating element) rotates at a high rotation speed corresponding to the high vehicle speed, the internal combustion engine (second rotating element) rotates at a high rotation speed in order to output corresponding drive power, and the drive shaft and the internal combustion engine rotate at a high rotation speed; thus, the first motor (first rotating element) also rotates at a high rotation speed to a positive rotation side. Accordingly, all of the first rotating element, the fifth rotating element, the second rotating element, and the third rotating element are brought into a state of rotating at a high rotation speed. In this state, if the ignition is off, while the drive shaft (third rotating element) is maintained at a high rotation speed by inertia, the internal combustion engine (second rotating element) decreases quickly in rotation speed due to stopping of fuel injection and ignition. At this time, the rotation speed of the first motor (first rotating element) not only decreases rapidly with a quick decrease in the rotation speed of the internal combustion engine (second rotating element) but also is about to increase rapidly in the negative rotation direction. Since the fifth rotating element is arranged between the first rotating element and the second rotating element on the alignment chart, the rotation speed of the fifth rotating element decreases, but the decrease is smaller than the degree of decrease in the rotation speed of the first motor (first rotating element), and is about to increase in the negative rotation direction. If the brake is turned on, the fifth rotating element is kept un-rotatable when the rotation speed becomes a value of 0. For this reason, it is possible to prevent the rotation speed of the first motor (first rotating element) from further increasing in the negative rotation direction. As a result, when the ignition is off while the vehicle is traveling at a high vehicle speed, it is possible to prevent the first motor from excessively rotating in the negative rotation direction.

In the hybrid vehicle of the above-described aspect, the electronic control unit may be configured to turn on the brake after an absolute value of a rotation speed of the fifth rotating element becomes equal to or less than a threshold at the time of the ignition-off at the high vehicle speed. With this, it is possible to reduce shock when the brake is turned on.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is an explanatory view showing an example of an alignment chart when the brake B1 is on.

FIG. 9 is an explanatory view showing an example of an alignment chart when the vehicle speed V decreases after the brake B1 is on.

DETAILED DESCRIPTION OF EMBODIMENTS

Next, the mode for carrying out the present disclosure will be described in connection with an embodiment.

Figure 1:
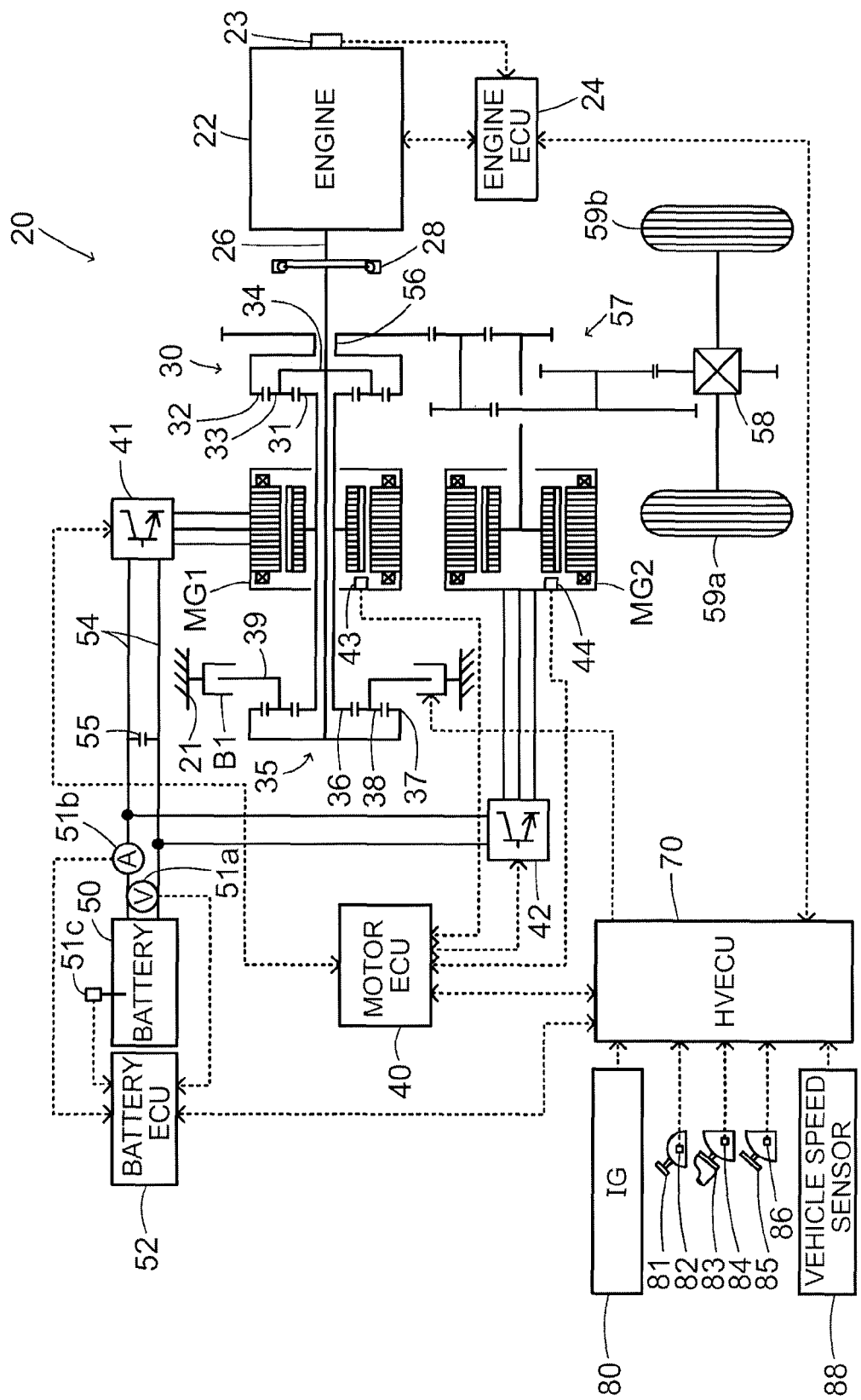
FIG. 1 is a configuration diagram showing the outline of the configuration of a hybrid vehicle 20 as an embodiment of the present disclosure.

FIG. 1 is a configuration diagram showing the outline of the configuration of a hybrid vehicle 20 as an embodiment of the present disclosure.

As shown in FIG. 1, the hybrid vehicle 20 of the embodiment includes an internal combustion engine 22, a first planetary gear 30, a second planetary gear 35, a first motor MG1, a second motor MG2, a first inverter 41, a second inverter 42, a battery 50, and an electronic control unit (hereinafter, referred to as "HVECU") 70 for hybrid.

The internal combustion engine 22 is constituted as an internal combustion engine which outputs drive power using fuel, such as gasoline or light oil. The internal combustion engine 22 is operated and controlled by an electronic control unit (hereinafter, referred to as an "internal combustion engine ECU") 24 for an internal combustion engine.

Though not shown, the internal combustion engine ECU 24 is constituted as a microprocessor centering on a CPU, and includes, in addition to the CPU, an ROM which stores a processing program, an RAM which temporarily stores data, an input/output port, and a communication port.

The internal combustion engine ECU 24 receive signals from various sensors required for operating and controlling the internal combustion engine 22 through the input port. Some of the signals from various signals are as follows.

A crank angle θcr from a crank position sensor 23 which detects a rotation position of a crank shaft 26 of the internal combustion engine 22

A throttle opening TH from a throttle valve position sensor which detects a position of a throttle valve Various control signals for operating and controlling the internal combustion engine 22 are output from the internal combustion engine ECU 24 through the output port. Some of various control signals are as follows.

A drive control signal to a throttle motor which adjusts the position of the throttle valve A drive control signal to a fuel injection valve A drive control signal to an ignition coil integrated with an igniter The internal combustion engine ECU 24 is connected to the HVECU 70 through the communication port. The internal combustion engine ECU 24 operates and controls the internal combustion engine 22 according to a control signal from the HVECU 70. The internal combustion engine ECU 24 outputs data relating to the operation state of the internal combustion engine 22 to the HVECU 70 as necessary. The internal combustion engine ECU 24 calculates an angular velocity and a rotation speed of the crank shaft 26, that is, an angular velocity ωne and a rotation speed Ne of the internal combustion engine 22, based on the crank angle θcr from the crank position sensor 23.

The first planetary gear 30 is constituted as a single pinion type planetary gear mechanism having a sun gear 31 of an external gear, a ring gear 32 of an internal gear, a plurality of pinion gears 33 which mesh with the sun gear 31 and the ring gear 32, and a carrier 34 which holds a plurality of pinion gears 33 rotatably and revolvably. A rotor of the first motor MG1 is connected to the sun gear 31. A drive shaft 56 coupled to drive wheels 59a, 59b through a differential gear 58 and a gear mechanism 57 is connected to the ring gear 32. The crank shaft 26 of the internal combustion engine 22 is connected to the carrier 34 through a damper 28. The supply of lubricating oil to the planetary gear 30 is performed by an oil pump (not shown), and lubricating oil is also supplied to the pinion gears 33 by the rotation of the carrier 34, or the like.

The second planetary gear 35 is constituted as a single pinion type planetary gear mechanism having a sun gear 36 of an external gear, a ring gear 37 of an internal gear, a plurality of pinion gears 38 which mesh with the sun gear 36 and the ring gear 37, and a carrier 39 which holds a plurality of pinion gears 38 rotatably and revolvably. The sun gear 36 is connected to the sun gear 31 of the planetary gear 30, and the ring gear 37 is connected to the carrier 34 of the planetary gear 30. The carrier 39 is connected to a case 21 through the brake B1. The brake B1 is constituted as a frictional engagement element for hydraulic drive. The supply of lubricating oil to the planetary gear 35 is performed by an oil pump (not shown), and lubricating oil is also supplied to the pinion gear 38 by the rotation of the carrier 39, or the like.

The first motor MG1 is constituted as, for example, a synchronous power generation motor. As described above, the first motor MG1 has the rotor connected to the sun gear of the planetary gear 30. The second motor MG2 is constituted as, for example, a synchronous power generation motor. The second motor MG2 has a rotor connected to the drive shaft 56 through the gear mechanism 57. The first inverter 41 and the second inverter 42 are connected to a power line 54 along with the battery 50. A smoothing capacitor 55 is attached to the power line 54. The first motor MG1 and the second motor MG2 are rotated and driven by an electronic control unit (hereinafter, referred to as a "motor ECU") 40 which controls switching of a plurality of switching elements (not shown) of the first inverter 41 and the second inverter 42. In this way, the battery 50 is configured to transmit and receive electric power to and from the first motor MG1 and the second motor MG2 through the power line 54.

Though not shown, the motor ECU 40 is constituted as a microprocessor centering on a CPU, and includes, in addition to the CPU, an ROM which stores a processing program, an RAM which temporarily stores data, an input/output port, and a communication port.

The motor ECU 40 receives signals from various sensors required for driving and controlling the first motor MG1 and the second motor MG2 through the input port. Some of the signals from various sensors are as follows.

A rotation position θm1 from a first rotation position detection sensor 43 which detects the rotation position of the rotor of the first motor MG1 and a rotation position θm2 from a second rotation position detection sensor 44 which detects the rotation position of the rotor of the second motor MG2

A phase current from a current sensor which detects a current flowing in each phase of the first motor MG1 and the second motor MG2

A switching control signal to the switching elements (not shown) of the first inverter 41 and the second inverter 42, or the like is output from the motor ECU 40 through the output port.

The motor ECU 40 is connected to the HVECU 70 through the communication port. The motor ECU 40 drives and controls the first motor MG1 and the second motor MG2 according to a control signal from the HVECU 70. The motor ECU 40 outputs data relating to the drive state of the first motor MG1 and the second motor MG2 to the HVECU 70 as necessary. The motor ECU 40 calculates the rotation speeds Nm1, Nm2 of the first motor MG1 and the second motor MG2 based on the rotation positions θm1, θm2 of the rotors of the first motor MG1 and the second motor MG2 from the first rotation position detection sensor 43 and the second rotation position detection sensor 44.

The battery 50 is constituted of, for example, a lithium-ion secondary battery or a nickel-hydrogen secondary battery. As described above, the battery 50 is connected to the power line 54 along with the inverters 41, 42. The battery 50 is managed by an electronic control unit (hereinafter, referred to as a "battery ECU") 52 for a battery.

Though not shown, the battery ECU 52 is constituted as a microprocessor centering on a CPU, and includes, in addition to the CPU, an ROM which stores a processing program, an RAM which temporarily stores data, an input/output port, and a communication port.

The battery ECU 52 receives signals from various sensors required for managing the battery 50 through the input port. Some of the signals from various sensors are as follows.

A battery voltage Vb from a voltage sensor 51a provided between the terminals of the battery 50

A battery current Ib (when discharging is performed from the battery 50, a positive value) from a current sensor 51b attached to the output terminal of the battery 50

A battery temperature Tb from a temperature sensor 51 c attached to the battery 50

The battery ECU 52 is connected to the HVECU 70 through a communication port. The battery ECU 52 outputs data relating to the state of the battery 50 to the HVECU 70 as necessary. The battery ECU 52 calculates charging/discharging electric power Pb as the product of the battery voltage Vb from the voltage sensor 51a and the battery current Ib of the current sensor 51b. The battery ECU 52 calculates a power storage ratio SOC based on the integrated value of the battery current Ib from the current sensor 51b. The power storage ratio SOC is the ratio of the capacity dischargeable from the battery 50 to the total capacity of the battery 50.

Though not shown, the HVECU 70 is constituted as a microprocessor centering on a CPU, and includes, in addition to the CPU, an ROM which stores a processing program, an RAM which temporarily stores data, an input/output port, and a communication port.

The HVECU 70 receives signals from various sensors through the input port. Some of the signals from various signals are as follows.

An ignition signal IG from an ignition switch 80

A shift position SP from a shift position sensor 82 which detects an operation position of a shift lever 81

An accelerator opening Acc from an accelerator pedal position sensor 84 which detects a depression amount of an accelerator pedal 83

A brake pedal position BP from a brake pedal position sensor 86 which detects a depression amount of a brake pedal 85

A vehicle speed V from a vehicle speed sensor 88

A drive signal to the brake B1, or the like is output to the HVECU 70 through the output port.

As described above, the HVECU 70 is connected to the internal combustion engine ECU 24, the motor ECU 40, and the battery ECU 52 through the communication port. The HVECU 70 transmits and receives various control signals or data to and from the internal combustion engine ECU 24, the motor ECU 40, and the battery ECU 52.

Figure 2:
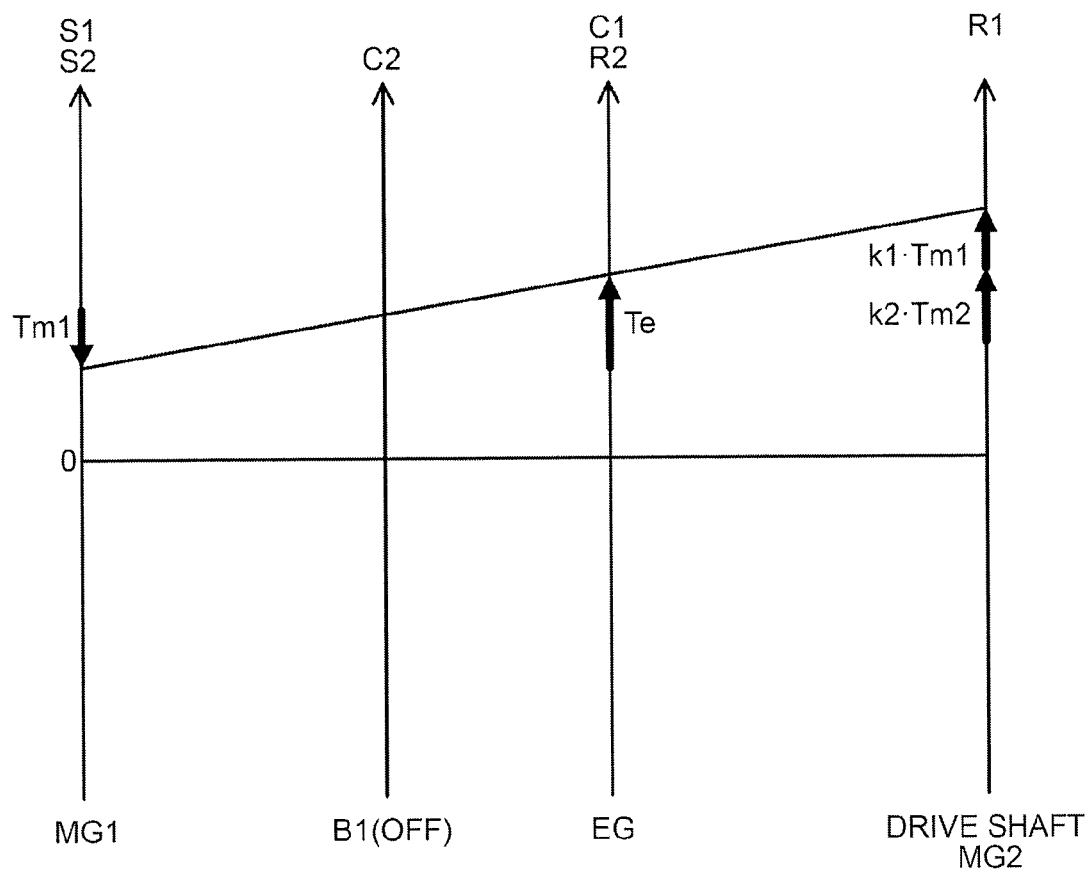
FIG. 2 is an explanatory view showing an example of an alignment chart when the vehicle travels in an HV traveling mode in a state where a brake B1 is off.
Figure 3:
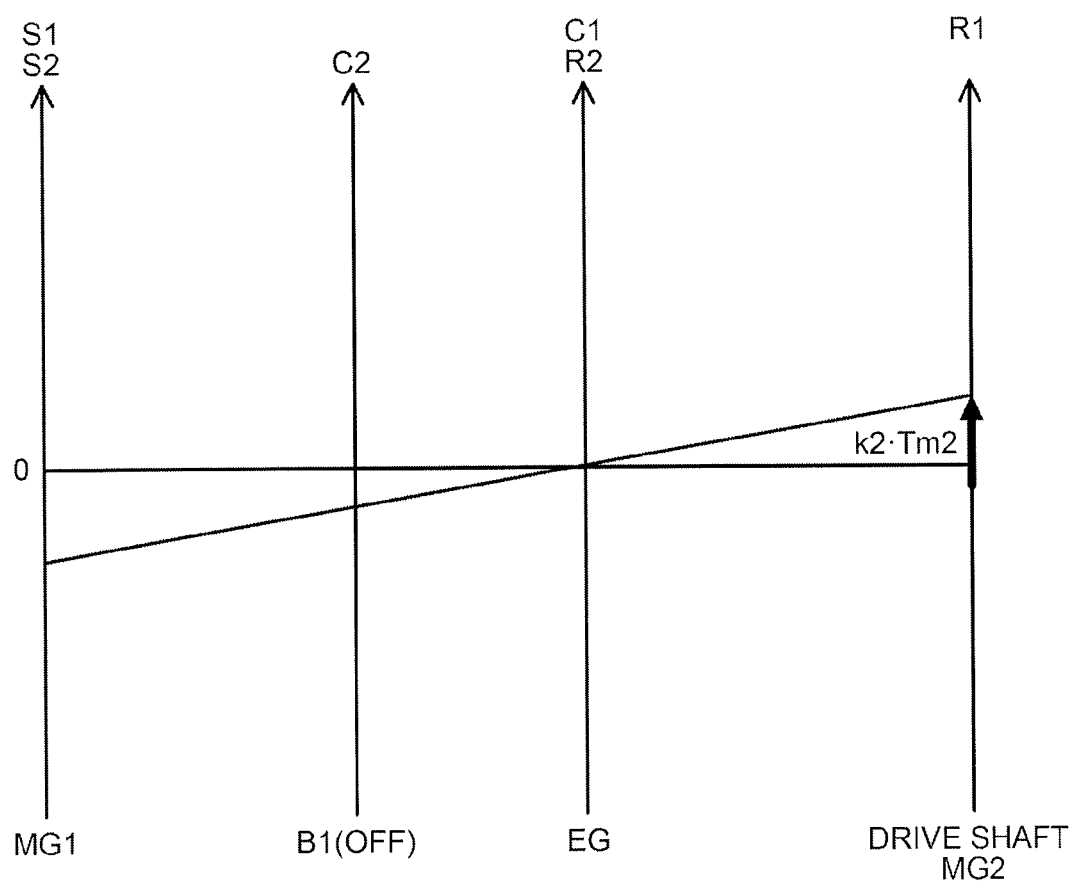
FIG. 3 is an explanatory view showing an example of an alignment chart when the vehicle travels in an EV traveling mode in a state where the brake B1 is off.

The hybrid vehicle 20 of the embodiment configured as above normally travels in a hybrid traveling mode (HV traveling mode) or an electric traveling mode (EV traveling mode) in a state where the brake B1 is off. The HV traveling mode is a traveling mode in which the vehicle travels using drive power from the internal combustion engine 22, the motor MG1, and the motor MG2. The EV traveling mode is a traveling mode in which the vehicle stops the operation of the internal combustion engine 22 and travels using drive power from the second motor MG2. FIG. 2 is an explanatory view showing an example of an alignment chart when the vehicle travels in the HV traveling mode in a state where the brake B1 is off, and FIG. 3 is an explanatory view showing an example of an alignment chart when the vehicle travels in the EV traveling mode in a state where the brake B1 is off. In the drawings, S1, S2 axes indicate the rotation speeds of the sun gear 31 of the first planetary gear 30 and the sun gear 36 of the second planetary gear 35 and indicate the rotation speed Nm1 of the first motor MG1. A C2 axis indicates the rotation speed of the carrier 39 of the second planetary gear 35. C1, R2 axes indicate the rotation speeds of the carrier 34 of the first planetary gear 30 and the ring gear 37 of the second planetary gear 35 and indicate the rotation speed Ne of the internal combustion engine 22. An R1 axis indicates the rotation speed of the ring gear 32 of the first planetary gear 30 and indicates the rotation speed Np of the drive shaft 56. Bold arrows of the S1, S2 axes indicate torque Tm1 output from the first motor MG1. Bold arrows of the C1, R2 axes indicate torque Te output from the internal combustion engine 22. Two bold arrows of the R1 axis indicate torque applied to the drive shaft 56 by torque Tm1 output from the first motor MG1 and torque applied to the drive shaft 56 by torque Tm2 output from the second motor MG2. "k1" and "k2" are conversion coefficients. As shown in FIGS. 2 and 3, when the brake B1 is off, the carrier 39 of the second planetary gear 35 rotates freely, and the second planetary gear 35 is not involved in driving.

Figure 4:
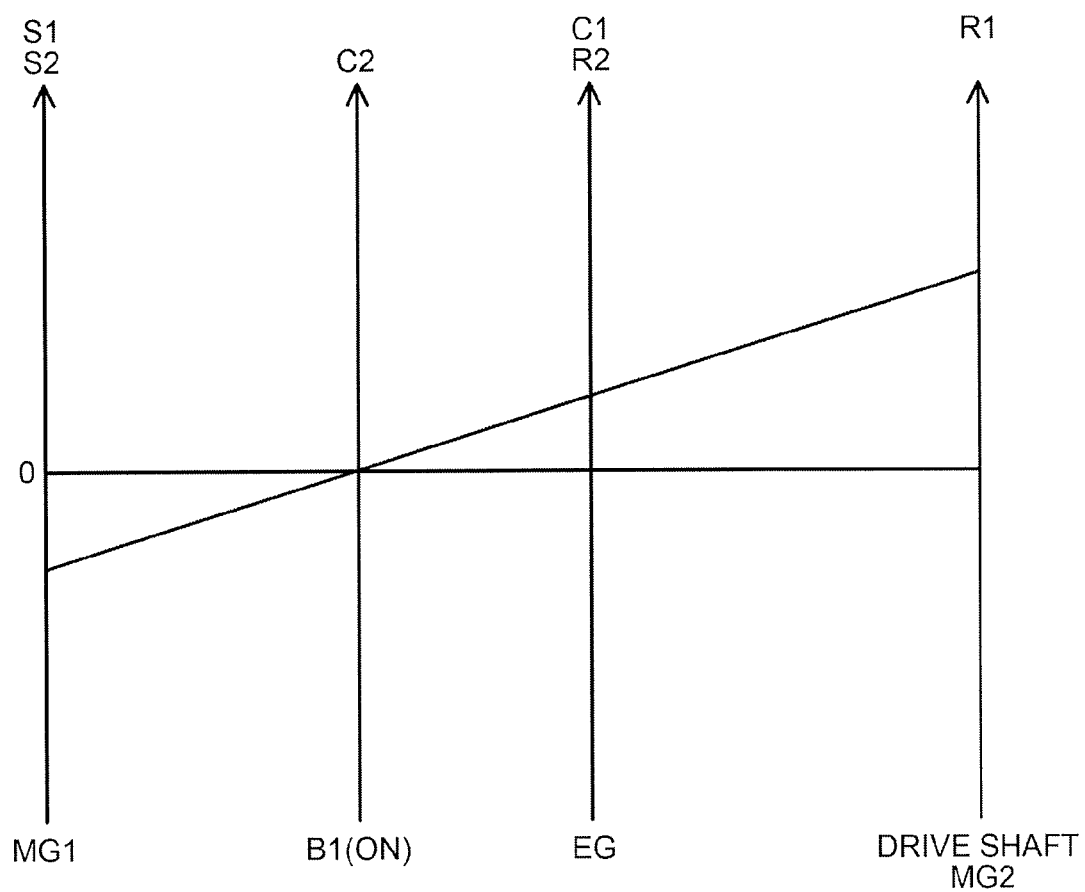

FIG. 4 is an explanatory view showing an example of an alignment chart when the brake B1 is on. When the brake is on, the carrier 39 of the second planetary gear 35 is fixed to the case 21 and cannot rotate; thus, as shown in FIG. 4, the vehicle travels at an operation point on a line along which the C2 axis passes through the value of 0.

Figure 5:
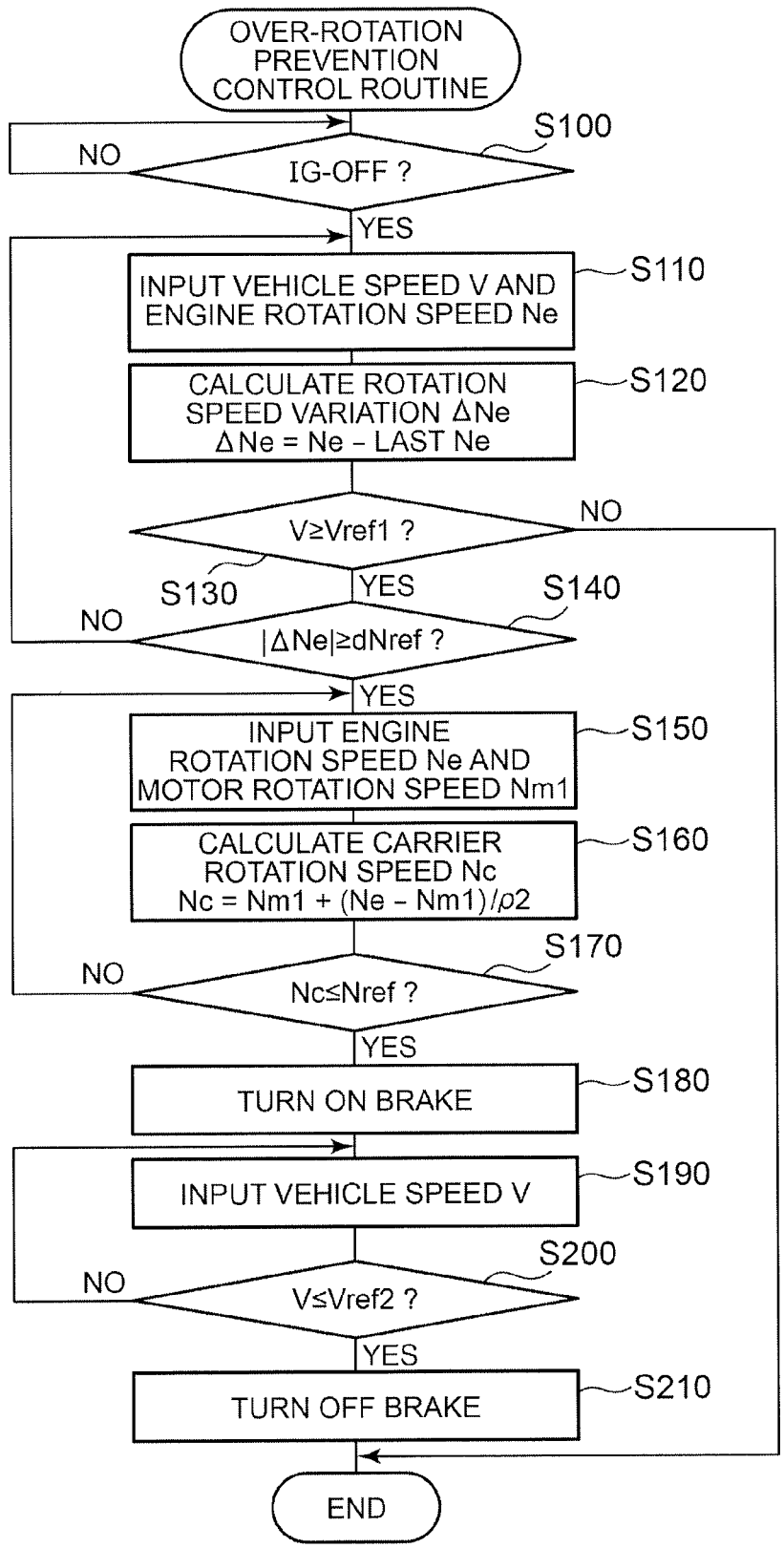
FIG. 5 is a flowchart showing an example of an over-rotation prevention control routine of a motor MG1 which is executed by an HVECU 70.

Next, the operation of the hybrid vehicle 20 of the embodiment configured as above, and in particular, the operation when the vehicle is traveling at a comparatively high vehicle speed and the ignition is off will be described. FIG. 5 is a flowchart showing an example of an over-rotation prevention control routine of the motor MG1 which is executed by the HVECU 70 when the vehicle is traveling while operating the internal combustion engine 22.

If the over-rotation prevention control routine is executed, the HVECU 70 first determines whether or not the ignition signal IG from the shift lever 81 is off (IG-OFF) (Step S100), and when the ignition is not off, repeatedly executes the determination processing. When the ignition is not off during traveling, and when the operation of the internal combustion engine 22 is stopped, for example, when the operation of the internal combustion engine 22 is stopped according to an operation stop request of the internal combustion engine in the HV traveling mode, when the operation of the internal combustion engine 22 is stopped with transition to the EV traveling mode, or the like, this routine ends.

If it is determined that the ignition is off, the vehicle speed V from the vehicle speed sensor 88 or the rotation speed Ne from the internal combustion engine 22 is input (Step S110). The rotation speed Ne of the internal combustion engine 22 which is calculated based on the crank angle θcr from the crank position sensor 23 can be input from the internal combustion engine ECU 24 through communication.

Subsequently, a variation ΔNe (ΔNe=Ne−last Ne) as the difference between the input rotation speed Ne of the internal combustion engine 22 and the rotation speed Ne (last Ne) of the internal combustion engine 22 input when last Step S110 is executed is calculated (Step S120). If the ignition is off, the fuel injection or ignition of the internal combustion engine 22 is stopped; thus, the rotation speed Ne of the internal combustion engine 22 decreases over time. Accordingly, the variation ΔNe becomes a negative value. When the ignition is off and Step S120 is executed first, the last Ne does not exist; thus, in the embodiment, a current value is used as an alternative, and the variation ΔNe is set to a value of 0.

Next, it is determined whether or not the vehicle speed V is equal to or greater than a threshold Vref1 (Step S130). The threshold Vref1 is set in advance as a vehicle speed which becomes an upper limit such that, when the rotation speed Ne of the internal combustion engine 22 is set to a value of 0, the rotation speed Nm1 of the first motor MG1 in the negative rotation direction is within an allowable rotation speed range, or a vehicle speed slightly lower than the upper limit. When the vehicle speed V is less than the threshold Vref1, it is determined that over-rotation of the first motor MG1 does not occur, and this routine ends.

If it is determined that the vehicle speed V is equal to or greater than the threshold Vref1, it is determined whether or not the absolute value of the rotation speed variation ΔNe of the internal combustion engine 22 is equal to or greater than a threshold dNref (Step S140). As described above, since the rotation speed variation ΔNe becomes a negative value, the determination processing becomes processing for determining whether or not the rotation speed deceleration of the internal combustion engine 22 is equal to or greater than the threshold dNref. The threshold dNref is set in advance as the deceleration of the rotation speed Ne of the internal combustion engine 22 for which the first motor MG1 will not over-rotate in the negative rotation direction since the deceleration of the rotation speed Ne of the internal combustion engine 22 is small. When the absolute value of the rotation speed variation ΔNe of the internal combustion engine 22 is less than the threshold dNref, it is determined that there is room for the first motor MG1 to over-rotate in the negative rotation direction, and the process returns to Step S110.

When the absolute value of the rotation speed variation ΔNe of the internal combustion engine 22 is equal to or greater than the threshold dNref, it is determined that the first motor MG1 is highly likely to over-rotate in the negative rotation direction, and processing (Step S150) for inputting the rotation speed Ne of the internal combustion engine 22 and the rotation speed Nm1 of the first motor MG1 and processing (Step S160) for calculating the rotation speed Nc of the carrier 39 of the second planetary gear 35 are repeatedly executed until the rotation speed Nc of the carrier 39 becomes equal to or less than the threshold Nref (Step S170). The rotation speed Nm1 of the first motor MG1 which is calculated based on the rotation position θm1 of the rotor of the first motor MG1 from the first rotation position detection sensor 43 can be input from the motor ECU 40 through communication. The rotation speed Nc of the carrier 39 can be calculated from a gear ratio ρ2 (the number of teeth of the sun gear 36/the number of teeth of the ring gear 37) of the second planetary gear 35 by Expression (1) described below. The threshold Nref is set in advance as the rotation speed of the carrier 39 for which torque shock does not occur such that an occupant feels a sense of unease even if the carrier 39 is fixed un-rotatably by the brake B1.

$$Nc=Nm1+(Ne-Nm1)/\rho2 \qquad (1)$$

If the rotation speed Nc of the carrier 39 becomes equal to or less than the threshold Nref, the brake B1 is turned on to stop the rotation of the carrier 39 (Step S180). It waits until the vehicle speed V becomes equal to or less than a threshold Vref2 (Steps S190 and S200), the brake B1 is turned off (Step S210), and this routine ends. The threshold Vref2 is set in advance as the vehicle speed V such that, even if the rotation speed Ne of the internal combustion engine 22 is set to the value of 0, the rotation speed Nm1 of the first motor MG1 in the negative rotation direction becomes sufficiently small.

Figure 6:
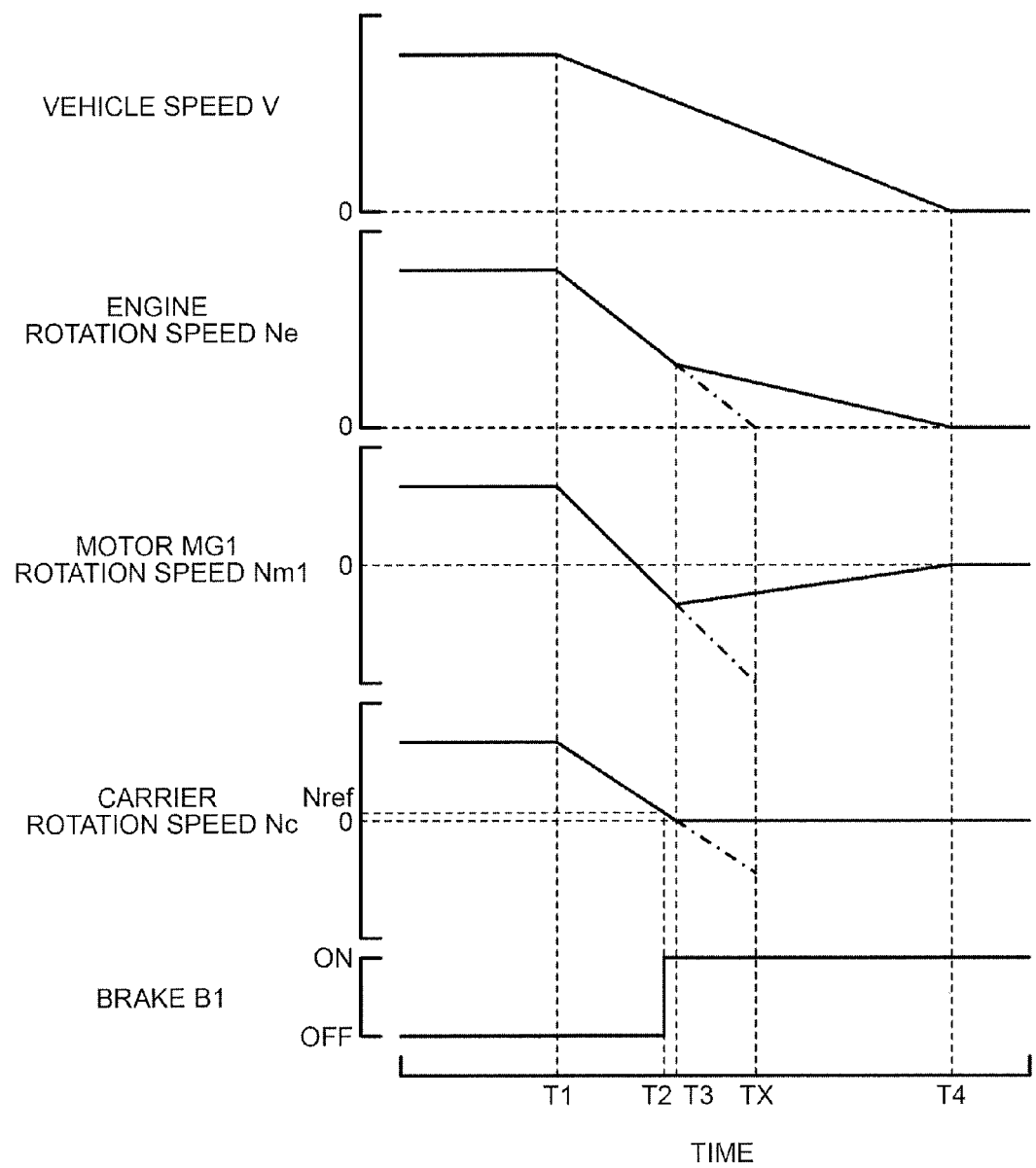
FIG. 6 is an explanatory view showing an example of temporal changes of a vehicle speed V, a rotation speed Ne of an internal combustion engine 22, a rotation speed Nm1 of a motor MG1, a rotation speed Nc of a carrier 39, and the state of the brake B1.
Figure 7:
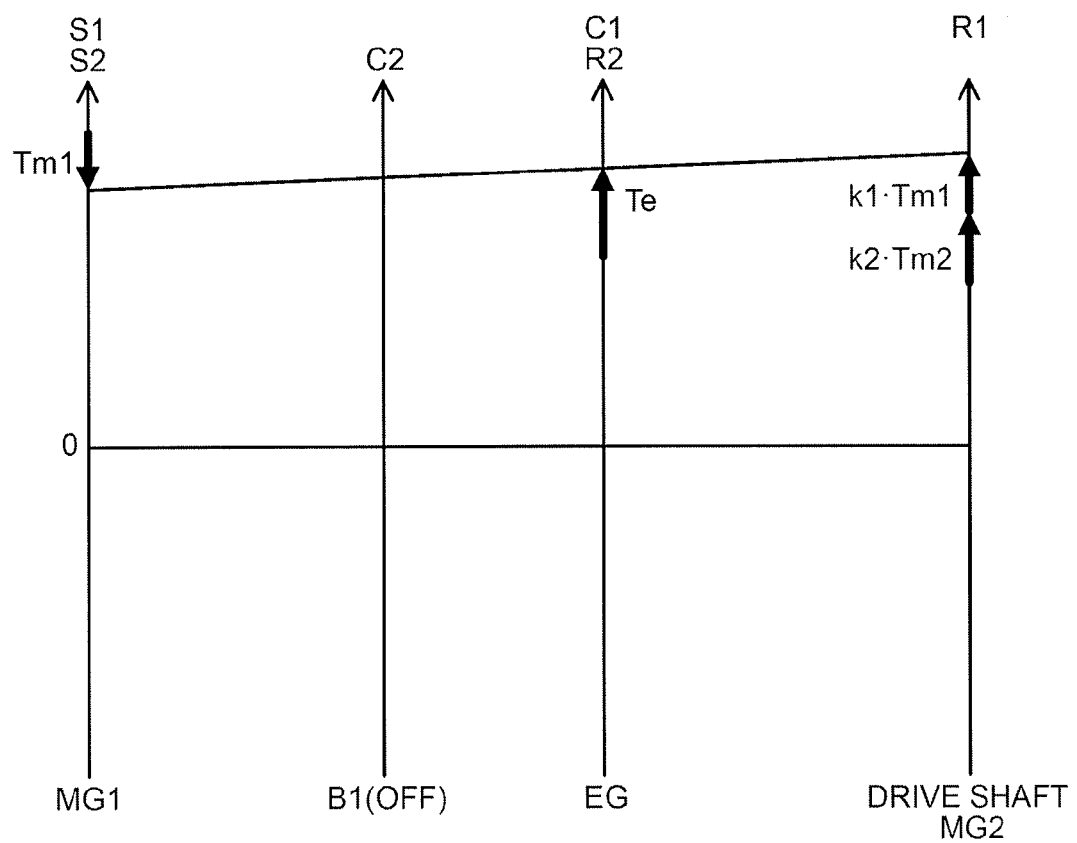
FIG. 7 is an explanatory view showing an example of an alignment chart when the vehicle is traveling at a comparatively high vehicle speed (for example, 180 km/h or the like).
Figure 8:
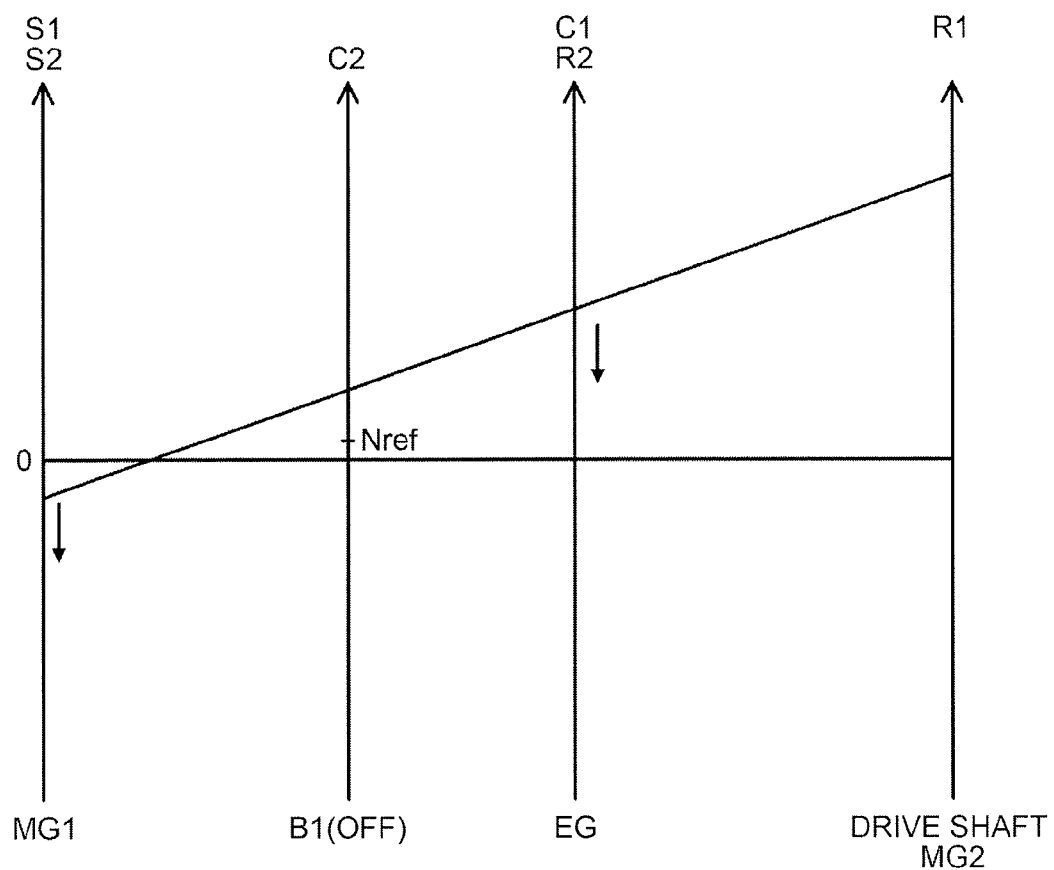
FIG. 8 is an explanatory view showing an example of an alignment chart when the rotation speed Ne of the internal combustion engine 22 decreases due to ignition-off.
Figure 9:
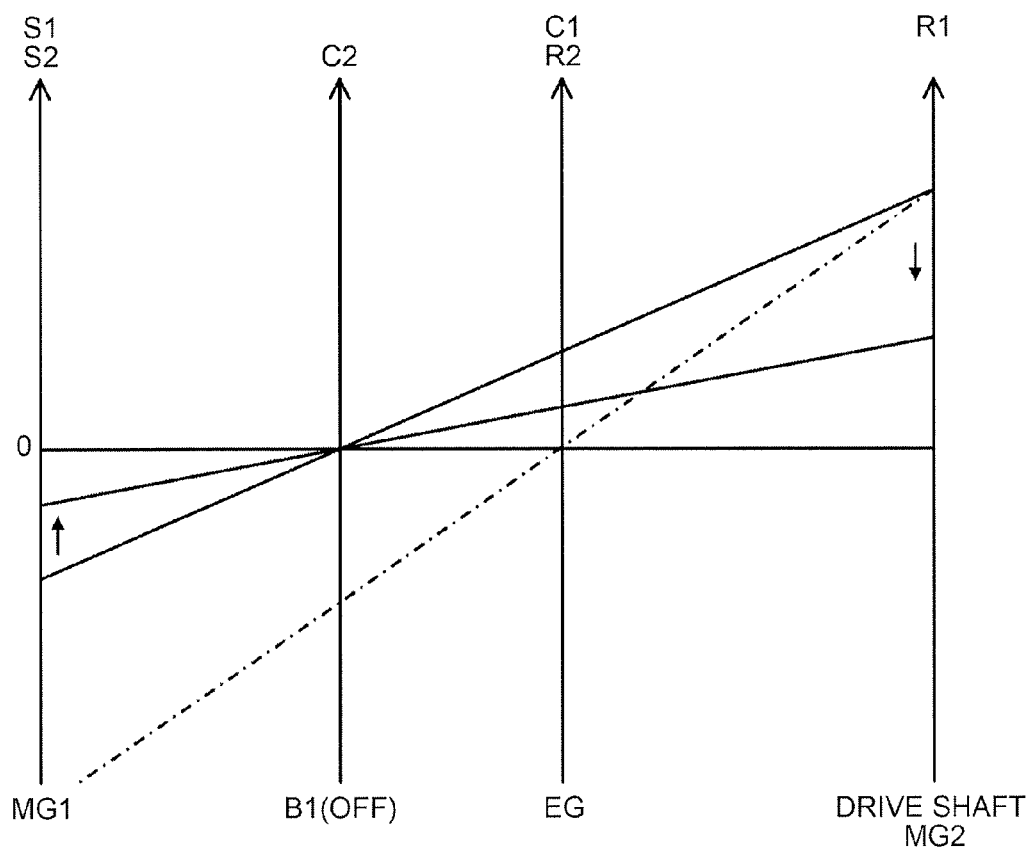

FIG. 6 is an explanatory view showing an example of temporal changes of the vehicle speed V, the rotation speed Ne of the internal combustion engine 22, the rotation speed Nm1 of the first motor MG1, the rotation speed Nc of the carrier 39, and the state of the brake B1 when over-rotation of the first motor MG1 in the negative rotation direction is prevented by the over-rotation prevention control routine of the embodiment. In the drawing, a solid line indicates a case where processing by the over-rotation prevention control routine of the embodiment is executed, and a one-dot-chain line indicates a case where the brake B1 is maintained to be off. FIG. 7 shows an example of an alignment chart when the vehicle is traveling at a comparatively high vehicle speed (for example, 180 km/h or the like). As shown in the drawing, when the vehicle is traveling at a comparatively high vehicle speed (for example, 180 km/h or the like; see the R1 axis), since comparatively large drive power is required, the rotation speed Ne (C1, R2 axes) of the internal combustion engine 22 becomes comparatively high, and accordingly, the rotation speed Nm1 (S1, S2 axes) of the first motor MG1 also becomes comparatively high. Since the carrier 39 (C2 axis) is positioned between the rotation speed Ne (C1, R2 axes) of the internal combustion engine 22 and the rotation speed Nm1 (S1, S2 axes) of the first motor MG1 on the alignment chart, similarly to the rotation speed Ne of the internal combustion engine 22 or the rotation speed Nm1 of the first motor MG1, a comparatively high rotation speed is obtained. If the ignition is off at the time T1 (see FIG. 6) from this state, the fuel injection or ignition of the internal combustion engine 22 is stopped, and thus, the rotation speed Ne of the internal combustion engine 22 rapidly decreases. FIG. 8 shows an example of an alignment chart when the rotation speed Ne of the internal combustion engine 22 decreases by ignition-off. As will be understood from FIGS. 7 and 8, the rotation speed Ne of the first motor MG1 rapidly decreases and becomes the negative rotation direction with a decrease in the rotation speed Ne of the internal combustion engine 22. The rotation speed Nc of the carrier 39 is not rapid with respect to change in the rotation speed Nm1 of the first motor MG1 but decreases with a decrease in the rotation speed Ne of the internal combustion engine 22. In addition, the rotation speed Ne of the internal combustion engine 22 decreases, if the rotation speed Nc of the carrier 39 reaches the threshold Nref (time T2), the brake B1 is turned on, and at the next time T3, the carrier 39 is maintained un-rotatably. FIG. 9 shows an example of an alignment chart when the vehicle speed V decreases after the brake B1 is turned on. In the drawing, a solid line indicates a state where the vehicle speed V decreases in the embodiment, and a one-dot-chain line indicates a state where the brake B1 is maintained to be off and the rotation speed Ne of the internal combustion engine 22 reaches the value of 0. An arrow indicates a direction in which the vehicle speed V decreases. If the brake B1 is turned on, as shown in FIG. 9, the rotation speed Nc of the carrier 39 is maintained to the value of 0; thus, the rotation speed Ne of the internal combustion engine 22 decreases with change in the vehicle speed V, and the rotation speed Nm1 of the first motor MG1 increases toward the value of 0 (see FIG. 6). When the vehicle speed V becomes the value of 0, the rotation speed Ne of the internal combustion engine 22 and the rotation speed Nm1 of the first motor MG1 also become the value of 0. In the over-rotation prevention control routine of FIG. 5, if the vehicle speed V becomes equal to or less than the threshold Vref2, the brake B1 is turned off; thus, immediately thereafter, the rotation speed Ne of the internal combustion engine 22 becomes the value of 0, the rotation speed Nm1 of the first motor MG1 increases slightly in the negative rotation direction at this time, and when the vehicle speed V becomes the value of 0, the rotation speed Nm1 of the first motor MG1 also becomes the value of 0. If the brake B1 is maintained to be off, as indicated by a one-dot-chain line of FIGS. 6 and 9, at the time TX at which the rotation speed Ne of the internal combustion engine 22 reaches the value of 0, the rotation speed Nm1 of the first motor MG1 increases extremely in the negative rotation direction, and the first motor MG1 over-rotates.

In the hybrid vehicle 20 of the embodiment configured as above, the first motor MG1 is coupled to the sun gear 31 of the first planetary gear 30 arranged in order on the alignment chart, the internal combustion engine 22 is coupled to the carrier 34, and the drive shaft 56 is coupled to the ring gear 32. The sun gear 31 is coupled to the sun gear 36 of the second planetary gear 35 arranged in order on the alignment chart, the carrier 34 is coupled to the ring gear 37, and the brake B1 is coupled to the carrier 39. When the ignition is off while the vehicle is traveling at the vehicle speed V which is a high vehicle speed equal to or higher than the threshold Vref1, the brake B1 is turned on to fix the carrier 39 un-rotatably. With this, it is possible to prevent over-rotation of the first motor MG1 in the negative rotation direction. Since the brake B1 is on when the rotation speed Nc of the carrier 39 becomes equal to or less than the threshold Nref, it is possible to reduce torque shock occurring when the brake B1 is on, and to prevent an occupant from feeling a sense of unease.

In the hybrid vehicle 20 of the embodiment, when the ignition is off while the vehicle is traveling at the vehicle speed V which is a high vehicle speed equal to or greater than the threshold Vref1, the brake B1 is on when the rotation speed Nc of the carrier 39 of the second planetary gear 35 becomes equal to or less than the threshold Nref. However, the brake B1 may be on when the rotation speed Nc of the carrier 39 is greater than the threshold Nref. In this case, it is possible to quickly decrease the rotation speed Ne of the internal combustion engine 22 by sliding the brake B1.

In the hybrid vehicle 20 of the embodiment, when the ignition is off while the vehicle is traveling at the vehicle speed V which is a high vehicle speed equal to or greater than the threshold Vref1, the brake B1 is on when the absolute value of the rotation speed variation $\Delta$Ne of the internal combustion engine 22 is equal to or greater than the threshold dNref. However, the brake B1 may be on regardless of the rotation speed variation $\Delta$Ne of the internal combustion engine 22.

The correspondence relationship between the primary components of the embodiment and the primary components of the present disclosure described in Summary will be described. In the embodiment, the internal combustion engine 22 corresponds to an "internal combustion engine", the first motor MG1 corresponds to a "first motor", the second motor MG2 corresponds to a "second motor, the first planetary gear 30 corresponds to a "first planetary gear mechanism", the second planetary gear 35 corresponds to a "second planetary gear mechanism", the brake B1 corresponds to a "brake", the battery 50 corresponds to a "battery", and the HVECU 70 corresponds to an "electronic control unit". The sun gear 31 corresponds to a "first rotating element", the carrier 34 corresponds to a "second rotating element", the ring gear 32 corresponds to a "third rotating element", the sun gear 36 corresponds to a "fourth rotating element", the carrier 39 corresponds to a "fifth rotating element", and the ring gear 37 corresponds to a "sixth rotating element".

The correspondence relationship between the primary components of the embodiment and the primary components of the present disclosure described in Summary should not be considered to limit the components of the present disclosure described in Summary since the embodiment is only illustrative to specifically describe the aspects of the present disclosure. That is, the present disclosure described in Summary should be interpreted based on the description in Summary, and the embodiment is only a specific example of the present disclosure described in Summary.

Although the mode for carrying out the present disclosure has been described using the embodiment, the present disclosure is not limited to the embodiment, and can be of course carried out in various forms without departing from the scope and spirit of the present disclosure.

The present disclosure can be applied to a manufacturing industry of a hybrid vehicle, or the like.

What is claimed is:

1. A hybrid vehicle comprising:
an internal combustion engine;
a first motor;
a second motor;
a first planetary gear mechanism including a first rotating element, a second rotating element, and a third rotating element, the first motor being coupled to the first rotating element, the internal combustion engine being coupled to the second rotating element, a drive shaft coupled to drive wheels of the hybrid vehicle and the second motor being coupled to the third rotating element, and the first planetary gear mechanism being configured such that the first rotating element, the second rotating element, and the third rotating element are arranged in order on an alignment chart;
a second planetary gear mechanism including a fourth rotating element, a fifth rotating element, and a sixth rotating element, the first rotating element coupled to the fourth rotating element, a brake connected to the fifth rotating element, the second rotating element coupled to the sixth rotating element, and the second planetary gear mechanism configured such that the fourth rotating element, the fifth rotating element, and the sixth rotating element are arranged in order on an alignment chart;
a battery configured to transmit and receive electric power to and from the first motor and the second motor; and
an electronic control unit configured to turn on the brake at a time of an ignition-off at a high vehicle speed of the hybrid vehicle such that the fifth rotating element is brought into a rotation stop state, the ignition-off at the high vehicle speed being when the ignition is off while the hybrid vehicle is traveling at a predetermined vehicle speed or higher while operating the internal combustion engine.

2. The hybrid vehicle according to claim 1, wherein the electronic control unit is configured to turn on the brake after an absolute value of a rotation speed of the fifth rotating element becomes equal to or less than a threshold at the time of the ignition-off at the high vehicle speed.

* * * * *